(12) United States Patent
Kerns et al.

(10) Patent No.: US 7,763,316 B2
(45) Date of Patent: Jul. 27, 2010

(54) NO HEXA SHELL SAND

(75) Inventors: Kelley J. Kerns, St. Joesph, MI (US); Robert H. Mizwicki, Naperville, IL (US); Ryan Schwark, Galien, MI (US)

(73) Assignee: Fairmount Minerals, Inc., Chardon, OH (US)

( * ) Notice: Subject to any disclaimer, the term of this patent is extended or adjusted under 35 U.S.C. 154(b) by 0 days.

(21) Appl. No.: 11/645,991

(22) Filed: Dec. 27, 2006

(65) Prior Publication Data

US 2007/0269593 A1    Nov. 22, 2007

Related U.S. Application Data

(60) Provisional application No. 60/801,628, filed on May 18, 2006.

(51) Int. Cl.
  *B05D 7/00*  (2006.01)
(52) U.S. Cl. .................................. 427/220; 427/212
(58) Field of Classification Search ................. 427/220, 427/212
  See application file for complete search history.

(56) References Cited

U.S. PATENT DOCUMENTS

| | | | |
|---|---|---|---|
| 3,288,747 A * | 11/1966 | Sussman ................. | 523/200 |
| 4,013,479 A * | 3/1977 | Biddle et al. ............ | 106/147.6 |
| 4,366,269 A | 12/1982 | Ohkawa et al. | |
| 4,745,024 A | 5/1988 | Jellinek et al. | |
| 4,767,801 A * | 8/1988 | Suzuki et al. ........... | 523/145 |
| 4,942,217 A | 7/1990 | Gardziella et al. | |
| 5,189,079 A | 2/1993 | Geoffrey et al. | |
| 5,648,404 A | 7/1997 | Gerber | |
| 5,910,521 A | 6/1999 | Johnson et al. | |
| 6,569,918 B2 | 5/2003 | Waitkus et al. | |
| 2002/0111425 A1 * | 8/2002 | Waitkus et al. ......... | 524/841 |
| 2002/0157439 A1 | 10/2002 | Gilbert | |

OTHER PUBLICATIONS

Jun. 12, 2009 Office Action from related U.S. Appl. No. 11/645,992, filed Dec. 26, 2006.
"Casting," Shell Molding, Metals Handbook, Desk Edition, 1985, American Society of Metals, pp. 23-6-23-8.
"Ecosorb Technology," Osisco Environmental Technology, 2004, Osisco Inc.

* cited by examiner

*Primary Examiner*—Michael Cleveland
*Assistant Examiner*—Robert Vetere
(74) *Attorney, Agent, or Firm*—Calfee, Halter & Griswold, LLP

(57) ABSTRACT

A formulation and method of use for eliminating the use of hexa in shell sand encapsulation is disclosed. The composition of matter consists of standard novalac resins with the hexa component replaced by solid granular resole or curing agent. The preferred formulation and method of compounding is given. Trace elements of ammonia, phenol and the like are further reduced by the addition of a preferred 50:50 mix of an ammonia buffer and masking agent. The preferred compounds for the ammonia buffer and masking agent mix are given.

24 Claims, 1 Drawing Sheet

NO HEXA SHELL SAND

This application claims the benefit of priority from U.S. Provisional Application 60/801,628 filed on May 18, 2006.

TECHNICAL FIELD OF THE INVENTION

The present invention relates generally to an improved process for coating sand, ceramics, and other substrates (generally industrial aggregates) with novalac resins and other similar coatings. More particularly it relates to a compound and method of application for producing resin-coated sand or other coated aggregates which cure with minimal or no odor.

BACKGROUND OF THE INVENTION

The prior art will be described in terms of resin coated sand used in the Shell Process employed by the metal casting and foundry industry. The shell process was developed in Germany during the Second World War, and the process was used to produce molds for mortars, artillery shells and other projectiles. The Germans attempted to keep the process secret after the war; however, the process was discovered by allied investigators who placed the process in the public domain as war booty which then provided the foundry industry with a revolutionary process.

The Shell Process (also known as the Croning or C Process) is used to produce hollow light weight molds and cores for pipe hubs, cores, crank shafts, intake manifolds for engines, etc. In fact, more foundries utilize the shell process, to produce resin sand cores and molds, than any other process. The process is extensively applied worldwide.

The original Croning process blended raw sand with powdered phenolic resin and powdered hexamethylenetetramine (a curing agent or hardener) "hexa" which was gravity fed into a preheated pattern. The heat melted the resin and hardener to fuse the sand within the pattern (or mold). After a suitable thickness of sand was obtained, the inactivated sand was dumped from the pattern, leaving the hollow core sand mold. As time went by, the process was improved by pre-coating the sand with the required ingredients (resin-hardener-wax-fillers-etc.) at a sand facility. The "foundry sand" is then sold as a free-flowing product to foundries (or foundries produce their own free-flowing product).

The current state of the art uses batch mixers to coat substrates (minerals, ceramics, etc. sometimes referred to generally as industrial aggregates) with a resin(s) and other ingredients. That is, sand (aggregate) is preweighed, heated to the desired temperature and transferred into a batch mixer. Resin (s) and additives are then added sequentially and held in the mixer until the material has reached the required cure stage or begins to break down into smaller agglomerated clumps of sand (aggregate) and resin. The mixture is then dumped and the cycle is repeated. Newer mixers now use a continuous process; however, the manufacturing steps and compounds used are essentially similar.

More specifically in the current state of the art for producing coated foundry sand preweighed sand is heated to between 280° F. to 380° F. The sand is then fed into a Muller type mill (or continuous mixer) and the resin dumped in to sand. The heat from the sand melts the resin and the resin flows around the sand grains to encapsulate the grain. After sufficient mull time, liquid hexa is added to the sand and resin, generally below 280° F. The hexa/resin mix reacts slightly to begin to crosslink the coating before a water quench is added to bring the sand temperature down to a temperature typically below 200° F. This quench stops the reaction of the hexa/resin and the resin coated sand is said to be at the "B" stage. The mixture continues to mull and dry completely and break apart into resin coated sand which essentially is an encapsulation of individual sand grains. The resin coated sand is advanced to the "C" stage when the coated sand is placed into a heated tool (the mold at a foundry) at 400-700° F. This heat liberates formaldehyde and ammonia from the original hexa solution (hexa in a liquid form is a combination of ammonia (40%) and formaldehyde (60%). The liberated formaldehyde reacts further with the resin to crosslink the resin and creates a solid form or a core or mold, and the free ammonia is given off as a volatile organic gas that has an odor that is offensive to the operators and the neighboring communities.

Several instances of a curing agent chosen to reduce emissions of ammonia appear in the prior art. Gardziella et al. disclosed a "Novel Heat-hardenable Binders Phenol-formaldehyde+HMT+Acid" in U.S. Pat. No. 4,942,217. Gardziella still used hexa as their curing agent but stated that the resin compounds and binders helped reduce emissions. An example of the composition used for "hot bake" (shell or Croning) casting sands was given.

Geoffrey et al., in U.S. Pat. No. 5,189,079, disclose a "Low Free Formaldehyde Phenolic Polyol Formulation" in which the inventors recognize the need to reduce the odor of formaldehyde in urethane binders which are used in the 'cold-box' and 'no-bake' core casting sand processes.

Johnson et al. disclosed a "Benzoxazine Polymer Composition" in U.S. Pat. No. 5,910,521 recognizing the need to cure novalac resins without the emission of ammonia. Johnson et al. disclose the use of their compound in foundry sand; however, their examples teach mixing of powdered resin with their powdered curing agent with the foundry sand. Johnson et al. state that their curing polymer may be a solid at room temperature and will take the form of a powder. However, they add that if the water removal is controlled during the manufacturing process, then the curing polymer may be produced in liquid form.

Waitkus et al. disclosed a "Polymer Composition for Curing Novalac Resins" in U.S. Pat. No. 6,569,918 also recognizing the need to reduce ammonia emissions. Waitkus et al., like Johnson et al., also disclose the use of their compound in foundry sand and with silica sand (proppants); however, unlike Johnson et al., the Waitkus examples disclose the addition of their curing agent as a liquid—a suspension in methanol—well after the sand is coated with the novalac resin (as a strict laboratory experiment). It should be remembered that the Waitkus compound includes odor producing ingredients.

Thus, there remains the need for resin-coated casting sand, or in general resin coated industrial aggregates, that reduces or eliminates offensive odors while keeping the required free flowing characteristic until the resin is activated in the mold.

SUMMARY OF THE INVENTION

The invention consists of the replacement of the standard hexa agent (used to produce formaldehyde as the curing agent) with a solid single stage resin, in granular form, as the innovative coating technology to provide the needed formaldehyde co-reactant to completely cure a novalac resin coated sand at the appropriate time in a mold. Two additional components may be added, during the coating process, in a preferred 50:50 mix to remove trace ammonia, phenol, and other odors produced in the final curing process.

The resin coated aggregate produced by the process results in resins that cure at temperatures just slightly above conventional curing temperatures with little release of ammonia. If the 50:50 mix is added during the coating process, the resulting composition of matter offers the option of precipitating the free ammonia and masking other odors. Thus, the innovative process and compound produces a coated aggregate that is easy to use, that is friendly to the environment and user, and that retains the expected qualities of novalac coated aggregates.

Figure 1:
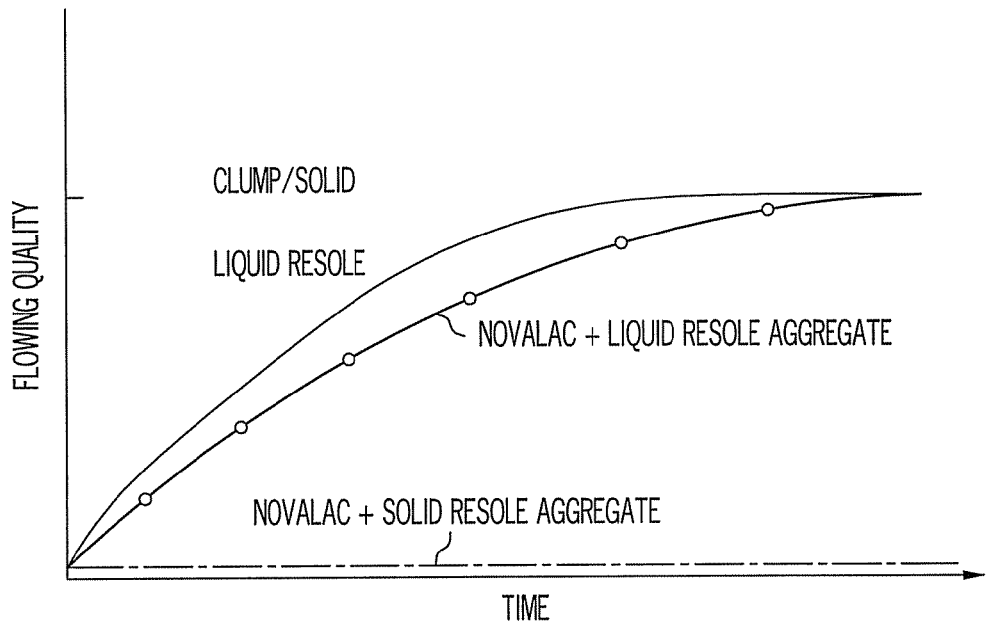
FIG. 1 shows the flow characteristics of a solid single stage resin, a liquid single stage resin, an aggregate coated with novalac-liquid resin and an aggregate coated with the novalac-solid resin of the instant invention all versus time.
Figure 2:
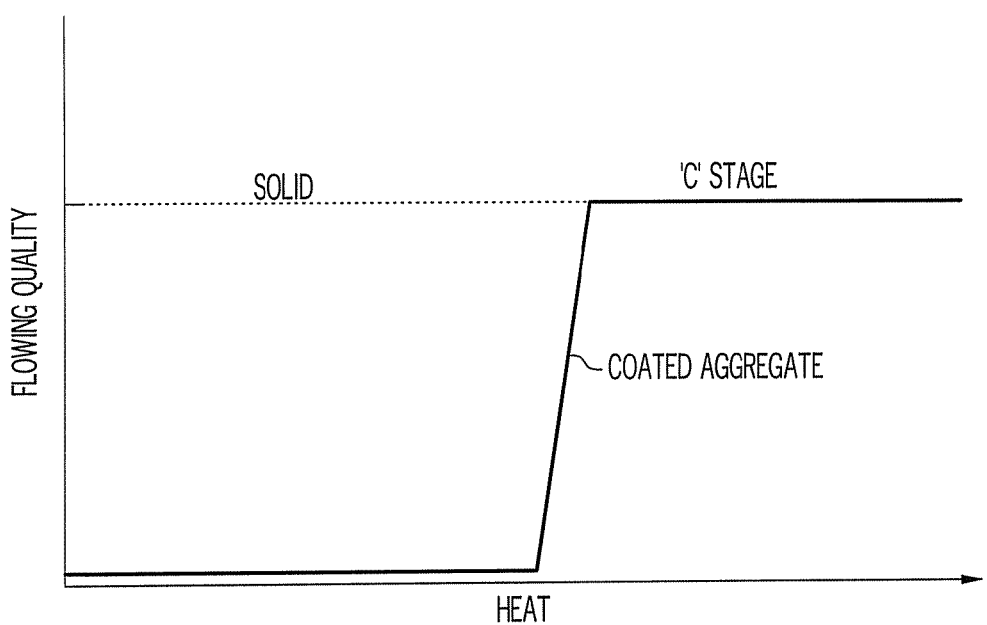
FIG. 2 shows a standard curing curve for resins versus heat for the instant product.

Table 1 shows a standard novalac coated resin compared with the current liquid resole art and formulations of the instant invention.

DESCRIPTION OF THE PREFERRED EMBODIMENT

Essentially the instant invention proposes a unique process for coating aggregates with a standard novalac resin and a granular single stage polymer curing agent producing a coated aggregate with standard properties for use in the metal casting industry and as a proppant in the oil industry. It also offers a new composition of matter that eliminates, by precipitation, any free ammonia and masks other curing odors when the product, produced by the process is taken to the "C" stage. The resulting product cures at standard temperatures and conditions while releasing minimal free ammonia or when the proper additive (explained below) is added no free ammonia is released.

In order to understand the preferred embodiment a brief understanding of the different resins used in the coating process is needed. Flake Resin is an acid catalyzed thermoplastic phenol-formaldehyde type resin. This type of resin is also referred to as a novalac resin, shell resin or two stage resin. Thermoplastic resins are normally solid at room temperature but when heated sufficiently melt and become liquid. When allowed to cool they return to a solid state. The heating and cooling cycle can be repeated numerous times, thus the name two stage resin. Novalac resins (two stage) do not have a sufficient amount of formaldehyde present in the resin to produce a complete cure, and more formaldehyde must be added to make the resin thermosetting. The additional formaldehyde required is usually supplied in the form of hexa. As stated earlier hexa is added in the mill during the coating cycle, but the coated sand is quickly cooled in the mill to stop the curing process.

The polymer curing agent used in the coating process is an alkaline catalyzed thermosetting phenol-formaldehyde type resin. The curing agent can be referred to as a single stage resin because the resin is a reactive system. The ratio of formaldehyde to phenol in the resin is such that all the formaldehyde needed for complete curing is present in the resin and all that is necessary to finish the cure is heat. Heating the resin causes a chemical reaction to take place which results in the resin changing from a solid to liquid to a solid mass. The reaction rate accelerates as it gets hotter and can become volatile before setting up. Being a thermosetting resin, once it becomes solid, it cannot be changed back to a liquid resin. Since these resins are temperature sensitive, keeping the resin stored at a cold temperature helps stabilize the resin and extend shelf life. The resins are available in liquid or powdered form, and it is known that liquid resins are more temperature sensitive than solid resins. (See FIG. 1.)

Returning now to a discussion of the preferred embodiment and examining the prior art, the prior art typical encapsulation formulations utilize a 2 step Novalac resin in combination with hexamethylenetetramine (60% formaldehyde/40% ammonia) as the co-reactant to cure the resin coated sand in an elevated temperature condition (280° F.+).

This invention uses as much as a 50% composition of solid resin (typical is 30%) in granular form with a novalac resin to fully cure the coated sand under heat. Prior art taught the use of liquid or powdered polymer curing agent; whereas, the unique concept is found in the use of solid granular resin (basically the size of rock salt) during the coating process. The use of granular resin results in controlled coating of the aggregate with the novalac-curing resin reducing the chance that the coating process will drive itself to the C-stage. When the product is deliberately driven to the C-stage (i.e., as a core or as proppant) the required formaldehyde comes completely from the curing agent. This reduces the adverse odor affects of the ammonia.

This invention offers a standard Novalac System combined with a solid granular resin without the use of hexa, thereby eliminating the source of ammonia. Ammonia produces evolved gas (a volatile organic compound VOC) which is basically an extremely offensive odor. Further, it is known that the ammonia gas produces ammoniacal nitrogen defects in steel castings.

The use of a single stage resin that would operate as the curing agent for novalac resins is not new. (See for example Waitkus et al., U.S. Pat. No. 6,569,918 and Johnson et al., U.S. Pat. No. 5,910,521 which are fully incorporated by reference and discussed above.)

The inventors are employees of a company that offers a low hexa coated aggregate that utilizes a novalac resin, plus a liquid resole with the addition of roughly one-half the normal amount of hexa (plus additives). In fact, the product comprises a 2-stage Novalac system in combination with the single stage "liquid resole" system up to 30% (70% novolac/30% resole), but the past art has not been able to gain adequate crosslink density/or tensile strength without the addition of 4-10% hexa based on resin content. The product, using hexa, works well, but still produces a relatively strong odor—mainly ammonia due to the hexa—when the aggregate is brought to the final cure stage (C-stage). A product formulation showing the current art is shown in table 1.

The shelf life of the current art product is extremely limited and is highly sensitive to heat, because of the properties of the liquid resole used in the formulation (as discussed above). FIG. 1 shows the flowing quality versus time for a liquid resole (LR) and for the novalac-LR coated aggregate described above. The coated aggregate has limited shelf life and is temperature sensitive and cannot be stored for extended periods of time as it will continue to advance resulting in the coated sand clumping and reduce flowability. The coated aggregate must be produced and shipped within seven days and brought to its C-stage within an additional seven days; otherwise, the coated aggregate will clump and cease to flow. Due to the nature of the product it will clump and become useless, if the product is kept over seven days in the manufacturer's storage silos (particularly in summer), and it is not recommended to ship the product by rail car (particularly in the summer) as it will clump and reduce flow.

The inventors set about to produce a more stable product utilizing the known properties of solid polymer curing agents (i.e., temperature stability) based on off-the-shelf powder polymers. Initial experiments were conducted using standard batch mixing techniques (explained above), mixing novalac resins, aggregate and the powdered curing agents. Remember, it was known that liquid agents would not produce a long-term stable product. The initial tests were a failure, because the coated aggregates exhibited low tensile strength and high melt points (well above the standard cure temperature of 210° F.) when they were tested in laboratory.

The inventors then tried a different curing agent (very close to the preferred curing agent of the present invention) which was also in a powder form. Again the experiment was a failure, because the product did not exhibit the required tensile strength and because the melt point (for curing) was too high. Some thought was given to the process, and it was decided that the temperature at which the curing agent was added might be too high making it too active; thereby, driving the product too far towards a final cure. The experiment was repeated and different temperatures were tried. The novalac resin was applied at some 320° F., the Muller was lowered to about 270° F. and the powdered curing resin added. This time the tensile strength increased, and the melt point was reduced. However, the coated aggregate was still not useful, because the final tensile strength was not high enough.

The inventors recognized that the mixing process itself still appeared to be too active. They deduced that the curing agent when it was added as a fine powder picked up heat too rapidly and reacted with the novalac driving the resulting compound almost fully to the C-stage before the reaction could be quenched. This problem had to be solved.

The inventors were encouraged by the experiment and wondered if the activity of the curing agent could be reduced. Reduction of the temperature at which the curing agent was added was not an option, as the agent had to be at about 270° F. in order to melt so that the agent would be able to bond (react) with the novalac resin. Something had to be done to reduce the activity of the curing agent. As a further experiment large chunks (about ½-inch in size) of the curing agent were used. It was believed that the chunks would melt more slowly and have less activity than a powder.

The concept was tried. Novalac resin was added to a Muller containing aggregate at about 330° F., and the apparatus was allowed to cool to 270° F. The large chucks of curing agent were added followed by standard quenching after the large chunks had blended into the mix. The experiment was successful in that the tensile strength increased and the melting point lowered to about 220° F.

The next step was to determine the optimum size for the curing agent. A series of experiments followed, and it was determined that fines were not acceptable. It was finally determined, by experimentation, that the granular size should fall between ¾-inch mesh and 40 mesh. A quantity of the granular size was ordered and industrial runs commenced. The result was an industrial coated aggregate that matched the tensile strength and had melting point that was roughly 218° F. (eight degrees higher than normal). The odor produced upon driving the coated aggregate to the C-stage was minimal.

The preferred solid polymer curing agent is manufactured by Plastic Engineering Company of Sheboygan, Wis. as PLENCO® Number 14094, although it is believed that a benzoxazine resin manufactured by Borden Chemical, Inc. of Columbus Ohio may be substituted. For that matter any resin that exhibits the properties of a thermosetting phenol-formaldehyde curing agent may be employed. As stated earlier the agent is used in granular form meeting the following maximum/minimum sieve requirements ¾-inch to 40 mesh with a preferred range of ½-inch to 20 mesh.

It should be realized that a thermosetting phenol-formaldehyde curing agent is known in the industry as a specifically formulated solid resin in which the formaldehyde to phenol is high. This allows the resin to donate formaldehyde to the novalac resin thereby acting as the co-reactant. The specially formulated resin will often have additional molecules 'tacked' onto the chain to act as an accelerant (example, hexa). Thus, the scope of the claims envisions any variant phenol-formaldehyde curing agent which will cause a novalac resin to crosslink at the required instant in time.

Even larger chunks may be used, but there is a reality that must be recognized in that more time is needed in the coating process for the larger chunks to melt and that time must lapse for large chunks to melt. In the meantime, the co-joined novalac/curing agent will continue to heat and drive towards the "C" stage which results in a low tensile strength product. Thus, the inventors envision that larger sizing can be used but the size is limited by the time and temperature elements in the coating process.

In quick review, the original prior art hexa process requires sand to be heated to between 280° F. to 380° F. The sand is then fed into a Muller type mill and the Novalac resin (thermoplastic flake) dumped in to sand. The heat from the sand melts the resin and the resin flows around the sand grains to encapsulate the grain. After sufficient mull time, hexa is added to the sand and resin, generally below 280° F. The hexa/resin reacts slightly before a water quench is added to bring the sand temperature down to a temperature typically below 200° F. This quench stops the reaction of the hexa/resin and the resin coated sand is said to be "B" staged. The sand continues to mull and dry completely and break down into resin coated sand providing the free flowing product that is stable and will not advance to the "C" stage until required.

Conversely, the instant process again requires heat to between 280° F. and 380° F. The sand is fed into the Muller or a continuous coater, the Novalac resin added and allowed to melt and wet coat the sand. The mix is allowed to cool while still being stirred. At a critical temperature between 230-285° F., the curing agent particles (preferably ½-inch to 20 mesh) are added to the mill and allowed to melt and coat the sand grains. Care is taken to quench the sand before it advances to the "C" stage. The resulting product is free flowing sand that is very stable and will not advance to the "C" stage until required.

The inventors found that there were still some residual odors due to trace ammonia, phenol and formaldehyde when the product was taken to the "C" stage.

In the meantime, the same inventors were working on a suitable method and compound to reduce free ammonia in a standard Novalac system employing hexa and in the low hexa coated aggregate, described earlier, that comprises a 2-stage Novalac system in combination with the single stage "liquid resole" system up to 30% (70% novolac/30% resole) plus 7% hexa. They determined that that an organic ammonia buffering solution would remove the trace ammonia and that a masking agent might well remove all traces (actually mask with a pleasant odor) those remaining malodors. Further details may be found in the inventors' copending application for a Composition of Matter and Method of Use for Elimination of Odors in Shell Sand Encapsulation filed as provisional application Ser. No. 60/801,629 on 18 May 2006 and as a co-pending utility to this application with a similar title as the Provisional Application. It was therefore decided to employ that composition with the above process.

As described in the co-pending application, tests determined that an organic ammonia buffering agent and a masking agent could be added to a hexa based process without degradation of the coated product. However, experimentation was required to determine when the agents should be added and to see if the resin-coated sand produced by the instant process was affected. The preferred buffering agent is sold as a solution and is generally added during the quenching stage. The preferred masking agent was sold as a dry power and could be added with the resin or it could be mixed with water and added after the quench phase with the buffering solution. Tests determined that the masking agent performed well and that the final quality of the resin-coated sand remained unaffected. Tests determined that the buffer solution and masking agent should be used in a 50:50 mix and could be added at almost any stage of the mulling/encapsulation process. The 50:50 mix could be adjusted.

As disclosed in their co-pending application, the inventors determined that a product sold by Odor Management, Inc, of Barrington, Ill. under the brand name ECOSORB-303SG was a suitable buffering agent. ECOSORB is an oil based (botanical) product. Essentially ECOSORB is based on organic hydrocarbon plant extract.

Essentially the buffering solution operates under the following chemical equation:

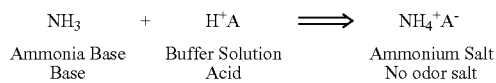

| NH$_3$ | + | H$^+$A | $\Longrightarrow$ | NH$_4^+$A$^-$ |
|---|---|---|---|---|
| Ammonia Base Base | | Buffer Solution Acid | | Ammonium Salt No odor salt |

As further disclosed in their co-pending application, the inventors determined that a product distributed by Univar USA, Inc, of Kirkland, Wash. under the brand name VANILLIN was a suitable masking agent. The affects of VANILLIN are not completely understood, although it performs a masking agent for remaining residual odors such as phenol, formaldehyde, ammonia. VANILLIN is 4-Hydrox-3-Methoxybenzaldehyde; 3-Methoxy-4-Hydroxbenzaldehyde.

Finally a series of product test runs was conducted to determine the range of constituents that made up the formulation. It was found that the percentage of curing agent could be adjusted between 50 and 15 percent (economics actually sets the range because the upper percentage can be set up as high as 70 percent: actually the experiments stopped at this point. Table 1 shows the range of the constituents of the formulation that results in the no odor, essentially no hexa composition of matter of the instant invention. Similarly, it was found that the preferred mix of 50:50 buffering agent to masking agent could be widely varied.

Thus, the inventors have discovered a new and useful process for the manufacture of a low ammonia emission novalac resin coated industrial aggregate and have further discovered a new composition of matter that reduces any ammonia produced by their novel process to an absolute minimum. Further the composition of matter will mask any malodors produced by phenols and the like which appear in novalac system resins.

The range of preferred composition of matter is set forth in Table below. The first column shows a standard novalac resin system using hexa and the next columns give a range over which the instant invention uses.

TABLE 1

| | | Solid Curing Agent | | |
|---|---|---|---|---|
| No Hexa | Standard | 50% | 30% | 15% |
| Sand | 97.36 | 97.51 | 97.51 | 97.51 |
| Resin 1 | 0.97 | 0.48 | 0.68 | 0.83 |
| Hexa | 0.36 | 0.00 | 0.00 | 0.00 |

TABLE 1-continued

| | | Solid Curing Agent | | |
|---|---|---|---|---|
| No Hexa | Standard | 50% | 30% | 15% |
| Curing Agent | 0.00 | 0.48 | 0.29 | 0.15 |
| Water | 1.2 | 1.46 | 1.46 | 1.46 |
| Accelerator | 0.024 | 0.02 | 0.02 | 0.02 |
| Buffer | 0.001 | 0.0005 | 0.0007 | 0.0008 |
| Mask | 0.001 | 0.0005 | 0.0007 | 0.0008 |
| Wax | 0.024 | 0.0240 | 0.0240 | 0.0240 |

It is possible to go to a novalac resin system where the quantity of solid resole is less than 15%, but it is believed that the resulting system would not provide the required properties for resin-coated aggregates. It is known, however, that limited quantities between one-half and 15 percent of hexa (hexamethylenetetramine) may be added back into the mixture thereby providing the needed co-reactant. Whereas a composition of matter using this combination would include hexa thereby falling slightly outside the perception of this disclosure, the amount of hexa would be small. Thus, it would be possible to increase the buffering agent to offset the hexa and, if necessary the masking agent, thereby simulating a no hexa composition of matter. Such an adjustment is considered to fall within the scope of the appended claims.

Thus, it is apparent that there has been provided a composition of matter that comprises a standard formulation for resin-coated sand replacing the standard hexa solution with solid granular resole while slightly reducing the quantity of novalac resin (as the solid resole itself acts as a resin) comprising as much as a 50% composition of solid resole (typical is 30%) with Novalac resin and other additives. There has also been provided the option of the addition of an ammonia buffer and masking agent in a preferred 50:50 mix to be added to the new composition in the ratio between 0.0015 and 0.5 percent each: this ratio being set by the actual product and needs. This option further reduces the formation of ammoniacal nitrogen which adversely affects the core casting process. Finally, there is provided the methods of manufacture for a non-odorous resin-coated sand comprising the addition of solid large ground resole (like rock salt) particles at a critical temperature between 230-285° F. in place of the standard hexa solution and allowing the resole to melt and coat the sand grains and then following standard processes. The addition of the buffer solution/masking agent may be made with the addition of the resole or during the quench and may be in solid or liquid form as is most convenient to coating process.

While this invention has been described with specific embodiments and its required methods of manufacture, it should be evident that many alternatives, modifications and variations would be apparent to those skilled in the art in light of the foregoing description (in particular the steps taken to determine how to manufacture the invention). Accordingly, it is intended to include all variations as set forth within the spirit and scope of the appended claims.

We claim:

1. A process for producing a free flowing resin coated industrial aggregate comprising
   (a) adding a solid polymer curing resin to a mass of aggregate particles carrying a molten novalac resin coating in an amount sufficient to completely cure the novalac resin,
   (b) mixing the mixture so formed at a temperature high enough so that the polymer curing resin coats the individual aggregate particles, (c) quenching the mixture before substantial crosslinking of the novalac resin occurs, and (d) drying the quenched mixture to produce the free-flowing resin coated industrial aggregate product, wherein the solid polymer curing resin when added in step (a) is in the form of granular particles having a particles size of about ¾ inch to 40 mesh, and further wherein the free flowing resin coated industrial aggregate product is made without addition of liquid hexamethylenetetramine.

2. The process of claim 1, wherein the particle size of the solid polymer curing resin when added in step (a) is about ½ inch to 20 mesh.

3. The process of claim 1, wherein the solid polymer curing resin is a phenol-aldehyde resin.

4. The process of claim 3, wherein the solid polymer curing resin is the reaction product of a phenol-aldehyde resin and hexamethylenetetramine or a benzoxazine polymer.

5. The process of claim 4, wherein the particle size of the solid polymer curing resin when added in step (a) is about ½ inch to 20 mesh.

6. The process of claim 1, wherein the resin coated industrial aggregate product is made without a liquid curing agent.

7. The process of claim 1, wherein the solid polymer curing resin is added in step (a) at a temperature of about 230 to 285° F., wherein the solid polymer curing resin is the reaction product of a phenol-aldehyde resin and hexamethylenetetramine, and wherein the amount of solid polymer curing resin added is about 15 to 50%, based on the combined amount of novalac resin and solid polymer curing resin in the resin coated industrial aggregate product.

8. The process of claim 7, wherein the resin coated industrial aggregate product is made without a liquid curing agent.

9. The process of claim 8, wherein the amount of solid polymer curing resin added is about 30%.

10. The process of claim 8, wherein an odor control agent comprising an organic plant extract buffering agent capable of reacting with and thereby capturing free ammonia is combined with the aggregate prior to step (d).

11. The process of claim 10, wherein a masking agent is combined with the aggregate prior to step (d).

12. The process of claim 11, wherein the masking agent is vanillin.

13. The process of claim 1, wherein the industrial aggregate product is a foundry sand product in which the novalac resin and solid polymer curing resin have been combined in such a way so that, when heated to curing temperature, the foundry sand product cures into a cured mass having a tensile strength sufficient to form a foundry sand mold useful for metal casting.

14. The process of claim 13, wherein the solid polymer curing resin is added in step (a) at a temperature of about 230 to 285° F., and further wherein the foundry sand product is made without a liquid curing agent.

15. The process of claim 14, wherein the particle size of the solid polymer curing resin when added in step (a) is about ½ inch to 20 mesh.

16. The process of claim 14, wherein the solid polymer curing resin is a phenol-aldehyde resin.

17. The process of claim 14, wherein the solid polymer curing resin is the reaction product of a phenol-aldehyde resin and hexamethylenetetramine or a benzoxazine polymer.

18. The process of claim 14, wherein the solid polymer curing resin is the reaction product of a phenol-aldehyde resin and hexamethylenetetramine, and wherein the amount of solid polymer curing resin added is about 15 to 50%, based on the combined amount of novalac resin and solid polymer curing resin in the resin coated industrial aggregate product.

19. The process of claim 18, wherein the amount of solid polymer curing resin added is about 30%.

20. The process of claim 18, wherein the particle size of the solid polymer curing resin when added in step (a) is about ½ inch to 20 mesh.

21. The process of claim 18, wherein an odor control agent comprising an organic plant extract buffering agent capable of reacting with and thereby capturing free ammonia is combined with the aggregate prior to step (d), and further wherein a masking agent comprising vanillin is also combined with the aggregate prior to step (d).

22. The process of claim 13, wherein an odor control agent comprising an organic plant extract buffering agent capable of reacting with and thereby capturing free ammonia is combined with the aggregate prior to step (d).

23. The process of claim 22, wherein a masking agent is combined with the aggregate prior to step (d).

24. The process of claim 23, wherein the masking agent is vanillin and further wherein approximately equal amounts of odor control agent and masking agent are added.

* * * * *